United States Patent [19]

Mine et al.

[11] Patent Number: 5,416,190
[45] Date of Patent: May 16, 1995

[54] METHOD FOR THE MOLECULAR WEIGHT FRACTIONATION OF POLYHYDROGEN SILSESQUIOXANE

[75] Inventors: Katsutoshi Mine; Takashi Nakamura; Motoshi Sasaki, all of Chiba, Japan

[73] Assignee: Dow Corning Toray Silicone Co., Ltd., Tokyo, Japan

[21] Appl. No.: 145,923

[22] Filed: Oct. 29, 1993

[30] Foreign Application Priority Data

Nov. 24, 1992 [JP] Japan .................. 4-338103

[51] Int. Cl.⁶ .................................. C08F 6/12
[52] U.S. Cl. .................... 528/492; 528/494; 528/497; 528/498
[58] Field of Search .......... 528/492, 494, 497, 498

[56] References Cited

U.S. PATENT DOCUMENTS

| | | | |
|---|---|---|---|
| 3,615,272 | 10/1971 | Collins et al. | 23/366 |
| 5,063,267 | 11/1991 | Hannaman et al. | 524/284 |
| 5,279,661 | 1/1994 | Gentle | 106/287.1 |
| 5,310,583 | 5/1994 | Eckstein et al. | 427/575 |

FOREIGN PATENT DOCUMENTS

| | | |
|---|---|---|
| 448082 | 9/1991 | European Pat. Off. .......... 528/494 |
| 189126 | 10/1984 | Japan . |
| 42426 | 3/1985 | Japan . |
| 86017 | 5/1985 | Japan . |
| 127732 | 6/1986 | Japan . |

*Primary Examiner*—John C. Bleutge
*Assistant Examiner*—Mark D. Sweet
*Attorney, Agent, or Firm*—Roger E. Gobrogge

[57] ABSTRACT

Disclosed is a highly reproducible method for the molecular weight fractionation of polyhydrogen silsesquioxane that gives a very storage-stable polyhydrogen silsesquioxane having a freely selectable molecular weight. The method involves dissolving polyhydrogen silsesquioxane in active-hydrogen-free nonpolar solvent; adding an active-hydrogen-free polar solvent to the resulting solution in order to precipitate polyhydrogen silsesquioxane; and collecting the desired molecular weight fraction of polyhydrogen silsesquioxane.

14 Claims, No Drawings

METHOD FOR THE MOLECULAR WEIGHT FRACTIONATION OF POLYHYDROGEN SILSESQUIOXANE

BACKGROUND OF THE INVENTION

The present invention relates to a method for the molecular weight fractionation of polyhydrogen silsesquioxane. More specifically, the present invention relates to a highly reproducible method for the molecular weight fractionation of polyhydrogen silsesquioxane that yields a very storage-stable polyhydrogen silsesquioxane with any desired molecular weight.

Polyhydrogen silsesquioxane is a ladder-type or cage-type hydrogen-substituted polysiloxane with the following general formula:

$$(HSiO_{3/2})_n$$

in which n is an integer. By utilizing the reactivity of the Si-bonded hydrogen present in the molecule, a variety of organofunctional groups can be introduced into polyhydrogen silsesquioxane or the polyhydrogen silsesquioxane can itself be bonded to substrates such as organic resins and so forth. Moreover, since the polyhydrogen silsesquioxane molecule is free of organic groups, the silica afforded by its self-condensation characteristically has excellent heat resistance and excellent dielectric properties.

Polyhydrogen silsesquioxane is typically produced by the hydrolysis and polycondensation of trichlorosilane or trialkoxysilane (refer to Japanese Patent Publication Number Sho 47-31838[31,838/1972] and Japanese Patent Application Laid Open [Kokai or Unexamined] Numbers Sho 59-189126 [189,126/1984], Sho 60-42426 [42,426/1985], and Sho 60-86017 [86,017/1985]). The polyhydrogen silsesquioxane products of such processes are mixtures whose molecular weight distribution in each case ranges from several hundreds to several hundred thousands. In addition, the products of such processes contain large amounts of residues from the reaction catalyst used during synthesis and they contain ionic impurities in the form of alkali ions eluted from the reactor, heavy metal ions, and so forth.

When polyhydrogen silsesquioxane with a broad molecular weight distribution is used for the formation of silica thin films in the field of microelectronics (for example, as an interlevel dielectric in semiconductor elements), problems such as cracking in the silica thin film and so forth occur. In addition, polyhydrogen silsesquioxane which contains impurities, e.g., ionic impurities, etc., cannot even be used in microelectronic applications. For these reasons, fractionation of polyhydrogen silsesquioxane into a desired molecular weight distribution and reduction in its level of impurities (e. g., ionic impurities, etc.) is required.

In one example of a method for the molecular weight fractionation of an organosilsesquioxane, Japanese Patent Application Laid Open Number Sho 61-127732 [127,732/1986] proposes the molecular weight fractionation of an organosilsesquioxane by the addition of an organic solvent whose solubility limit corresponds to the maximum average molecular weight and an organic solvent whose solubility limit corresponds to the minimum average molecular weight to be fractionated. However, the high reactivity of the silicon-bonded hydrogen in polyhydrogen silsesquioxane precludes the use of certain solvents such as alcohols, amines, and mercaptans, in the molecular weight fractionation method taught in this reference. Moreover, application of this method is hampered by the different solubility behaviors of organopolysilsesquioxane and polyhydrogen silsesquioxane in various solvents. Finally, the method taught in this reference employs large quantities of several solvents. As a result, molecular weight fractionation by this method is poorly reproducible, inefficient and the yield of polyhydrogen silsesquioxane product is substantially reduced.

It is also generally known to purify and remove ionic impurities from organopolysiloxanes by washing with water. However, washing polyhydrogen silsesquioxane with water results in gelation due to the high reactivity of the silicon-bonded hydrogen in polyhydrogen silsesquioxane.

The object of the present invention is the introduction of a highly reproducible method for the molecular weight fractionation of polyhydrogen silsesquioxane that yields a very storage-stable polyhydrogen silsesquioxane which has a desirable molecular weight.

SUMMARY OF THE INVENTION

The present invention relates to a method for the molecular weight fractionation of polyhydrogen silsesquioxane. The method comprises dissolving polyhydrogen silsesquioxane in an active-hydrogen-free nonpolar solvent followed by the adding an active-hydrogen-free polar solvent to the resulting solution and recovering the desired molecular weight fraction. The novelty of the invention resides in the fact that the upper limit on the average molecular weight of the soluble polyhydrogen silsesquioxane is controlled by the mixing ratio between said nonpolar solvent and said polar solvent.

This invention further relates to a specific method for the molecular weight fractionation of polyhydrogen silsesquioxane comprising dissolving polyhydrogen silsesquioxane in active hydrogen-free nonpolar solvent; adding an active hydrogen-free polar solvent to the resulting solution to precipitate polyhydrogen silsesquioxane that exceeds the desired average molecular weight; removing the precipitated polyhydrogen silsesquioxane; and adding additional polar solvent to the resulting solution in order to precipitate polyhydrogen silsesquioxane having the desired average molecular weight.

DETAILED DESCRIPTION OF THE INVENTION

The present invention teaches a method for the molecular weight fractionation of polyhydrogen silsesquioxane, The method is highly reproducible and it yields a very storage-stable polyhydrogen silsesquioxane having a freely selectable molecular weight.

The polyhydrogen silsesquioxane to be fractionated by the method of the present invention has the following general formula:

$$(HSiO_{3/2})_n$$

in which n is an integer. The structure of the material, however, is not specifically restricted. This polyhydrogen silsesquioxane comprises what is generally known as ladder-type or cage-type siloxane. The group at the molecular chain terminal of ladder-type polyhydrogen silsesquioxane is not specifically restricted, and is exemplified by the hydroxyl group, triorganosiloxy groups, and diorganohydrogensiloxy groups. The molecular weight of this polyhydrogen silsesquioxane is also not specifically restricted.

The method for the preparation of the polyhydrogen silsesquioxane is not specifically restricted. One example of the preparative method consists of the hydrolysis and polycondensation of trichlorosilane or trialkoxysilane (refer to Japanese Patent Publication Number Sho 47-31838 and Japanese Patent Application Laid Open Numbers Sho 59-189126, Sho 60-42426, and Sho 60-86017).

In the method of the present invention, the polyhydrogen silsesquioxane is dissolved in an active-hydrogen-free nonpolar solvent. Active-hydrogen-free nonpolar solvents operable for the present invention comprise nonpolar solvents capable of yielding a homogeneous solution of the polyhydrogen silsesquioxane from the high-molecular-weight species to the low-molecular-weight species, but this solvent is not otherwise restricted as to type. The subject nonpolar solvent is specifically exemplified by aromatic solvents such as benzene, toluene, xylene, and so forth; aliphatic solvents such as hexane, heptane, octane, cyclohexane, cycloheptane, and so forth; and ether solvents such as diphenyl ether, dibutyl ether, and so forth. Toluene is the most preferred nonpolar solvent due to its excellent capacity to dissolve low-to-high molecular weight polyhydrogen silsesquioxane, its low volatility, and its wide use in industry.

If such an active-hydrogen-free nonpolar solvent is used upstream for the synthesis of the polyhydrogen silsesquioxane, the polyhydrogen silsesquioxane can then be transferred into the molecular weight fractionation process without isolation. Therefore, depending on the circumstances it may be necessary to select an active-hydrogen-free nonpolar solvent that is also useable for synthesis of the polyhydrogen silsesquioxane.

Due to the high reactivity of the silicon-bonded hydrogen in polyhydrogen silsesquioxane, the use of an active-hydrogen-free nonpolar solvent that is almost completely free of impurities such as water, alcohols, amines, mercaptans, etc. is preferred. In addition, active-hydrogen-free nonpolar solvents with dielectric constants roughly $\leq 5$ are generally preferred.

Next, an active-hydrogen-free polar solvent is added to the solution of active-hydrogen-free nonpolar solvent and polyhydrogen silsesquioxane. This is done in order to regulate or adjust the upper limit on the average molecular weight of the still soluble polyhydrogen silsesquioxane through the freely selectable mixing ratio between the nonpolar and polar solvents. A more detailed explanation of this is as follows: the upper limit on the average molecular weight of the still soluble polyhydrogen silsesquioxane can be freely regulated or adjusted by freely varying the mixing ratio between the nonpolar solvent (inert toward polyhydrogen silsesquioxane, upper limit on the average molecular weight of polyhydrogen silsesquioxane soluble therein=several hundred thousands, i.e. , capable of dissolving almost 100% of the polyhydrogen silsesquioxane ordinarily yielded by synthesis) and the polar solvent (inert toward polyhydrogen silsesquioxane, upper limit on the average molecular weight of polyhydrogen silsesquioxane soluble therein=several thousand). The utilization of this phenomenon makes possible molecular weight fractionation into polyhydrogen silsesquioxane having any desired molecular weight distribution.

The active-hydrogen-free polar solvents operable for the present invention are not specifically restricted. These polar solvents are specifically exemplified by nitriles such as acetonitrile, glycolonitrile, lactonitrile, and so forth, and by chloroacetone, o- chloronitrobenzene, and nitrobenzene. The most preferred polar solvent is acetonitrile due to its low toxicity and wide use in industry. Given the high reactivity of the silicon-bonded hydrogen in polyhydrogen silsesquioxane, the use of an active-hydrogen-free polar solvent that is almost completely free of impurities such as water, alcohols, amines, mercaptans, etc. is preferred. In addition, the dielectric constant of this polar solvent is preferably roughly at least 30.

Through the free selection of the mixing ratio between the aforesaid nonpolar solvent and the aforesaid polar solvent, the molecular weight fractionation method of the present invention makes possible molecular weight fractionation into polyhydrogen silsesquioxane having any desired average molecular weight from several thousands to several hundred thousands. In other words, polyhydrogen silsesquioxane with an average molecular weight in excess of the upper average molecular weight solubility limit is precipitated from the nonpolar solvent/polar solvent mixture as a function of the freely variable mixing ratio. The upper limit on the average molecular weight of the still soluble polyhydrogen silsesquioxane is essentially directly determined by the mixing ratio between the nonpolar solvent and polar solvent. Polyhydrogen silsesquioxane with a relatively narrow molecular weight distribution can be effectively fractionated by preparing a dilute solution of the polyhydrogen silsesquioxane in the active-hydrogen-free nonpolar solvent and then slowly dripping the active-hydrogen-free polar solvent into this solution while stirring as efficiently as possible. Variations in conditions within the system, such as the temperature, polyhydrogen silsesquioxane concentration, etc., should also be minimized. Moreover, polyhydrogen silsesquioxane with a relatively narrow molecular weight distribution can be obtained by redissolving polyhydrogen silsesquioxane already fractionated by the aforementioned method in active-hydrogen-free nonpolar solvent and dripping active-hydrogen-free polar solvent into this solution. Repetition of this process serves to further narrow the molecular weight distribution of the resulting polyhydrogen silsesquioxane as well as reduce its content of impurities.

The successive elimination of high-molecular-weight polyhydrogen silsesquioxane and low-molecular-weight polyhydrogen silsesquioxane is a method that affords polyhydrogen silsesquioxane with a relatively lower content of impurities and with a narrow molecular weight distribution free of high and low molecular weight polyhydrogen silsesquioxane. This method can be implemented by removing the high molecular weight polyhydrogen silsesquioxane first or by removing the low molecular weight polyhydrogen silsesquioxane first. The former procedure is exemplified as follows: polyhydrogen silsesquioxane is first dissolved in active hydrogen-free nonpolar solvent; active hydrogen-free polar solvent is then added to the resulting solution in order to produce a precipitate; this precipitate is eliminated and the supernatant is recovered; more active hydrogen-free polar solvent is subsequently added to the supernatant to produce a precipitate; and this precipitate is collected and the solvent is evaporated from it to yield the desired polyhydrogen silsesquioxane. The latter procedure is exemplified as follows: polyhydrogen silsesquioxane is first dissolved in active hydrogen-free nonpolar solvent; active hydrogen-free polar solvent is then added to the resulting solution to generate a precipitate; this precipitate is re-dissolved in active hydrogen-free nonpolar solvent; active hydrogen-free polar solvent is added to this second solution to yield a precipitate; this precipitate is removed and the solvent is evaporated from the supernatant to yield the desired polyhydrogen silsesquioxane. The former procedure is the more preferred because it yields the better reduction in impurities such as ionic impurities and so forth. In other words, a preferred method for the molecular weight fractionation of polyhydrogen silsesquioxane characteristically comprises the dissolution of the polyhydrogen silsesquioxane in active hydrogen-free nonpolar solvent; addition of active hydrogen-free polar solvent to the resulting solution in order to precipitate polyhydrogen silsesquioxane that exceeds the desired average molecular weight; removal of this polyhydrogen silsesquioxane; and further addition of the aforesaid polar solvent to the resulting solution in order to precipitate polyhydrogen silsesquioxane having the desired average molecular weight. This procedure is preferred for the following reason: when polyhydrogen silsesquioxane with the desired molecular weight distribution is produced in the above-described procedures in solution form, water and ionic impurities become concentrated in the solvent during solvent evaporation and this facilitates their reaction with the silicon-bonded hydrogen in the polyhydrogen silsesquioxane. The former procedure is therefore preferred because it avoids this situation to the maximum extent possible. The impurity-depleted polyhydrogen silsesquioxane afforded by this procedure is characterized by an excellent storage stability.

The method of the present invention for the molecular weight fractionation of polyhydrogen silsesquioxane is also preferably run in an inert gas atmosphere in order to avoid chemical changes in the polyhydrogen silsesquioxane during the fractionation process. Inert gases operable for the present invention are specifically exemplified by nitrogen and argon. In addition, the inert gas must not contain moisture.

The method of the present invention for the molecular weight fractionation of polyhydrogen silsesquioxane is preferably run in a container made of material from which ionic impurities (e. g., alkali components, etc. ) do not elute. The container is also preferably made of material that is neither altered by nor dissolves in the solvent used, and examples of such materials are high-quality glass and plastic. When a low-quality glass container is used, its alkali component elutes into the solvent during the molecular weight fractionation process and will cause changes in the polyhydrogen silsesquioxane product as time elapses. It is preferred in the present invention, for example, that a high-quality glass container be preliminarily washed with acid and then with pure water and then thoroughly dried.

In order to obtain a highly reproducible fractionation into polyhydrogen silsesquioxane with any desired molecular weight distribution, it is also very important in the method of the present invention for the molecular weight fractionation of polyhydrogen silsesquioxane to hold constant such factors as the purity, water content, type, and temperature of the solvent, the container, the stirring rate, the stirring mode, the polyhydrogen silsesquioxane concentration, and so forth. In addition, the polyhydrogen silsesquioxane having a desired molecular weight as afforded by molecular weight fractionation under the aforementioned conditions can be further subjected to repetitive molecular weight fractionation using the same conditions to yield polyhydrogen silsesquioxane with an even more desirable molecular weight.

Because polyhydrogen silsesquioxane produced by the molecular weight fractionation method of the present invention has a narrow molecular weight distribution, it yields a silica thin film that has an excellent heat resistance and excellent resistance to cracking. In addition, because polyhydrogen silsesquioxane produced by the molecular weight fractionation method of the present invention has a low content of impurities such as ionic impurities, etc., it is useful as the main component of agents for the formation of silica thin films in microelectronics, for example, for the formation of interlevel dielectrics in semiconductor elements.

The invention will be explained in greater detail through working examples. Molecular weight measurement of the polyhydrogen silsesquioxanes was carried out by gel permeation chromatography (GPC) using toluene as carrier solvent and using a polystyrene standard as reference material for construction of the molecular weight working curve.

REFERENCE EXAMPLE 1

Polyhydrogen silsesquioxane was prepared by the method taught in Japanese Patent Publication Number Sho 47-31838 as follows:

Toluenesulfonic acid monohydrate was prepared by dripping 6 moles toluene over a period of 1 hour into a mixture of 3.75 moles sulfuric acid and 2.25 moles fuming sulfuric acid at a mixture temperature of 45° C. to 60° C. and then ageing for an additional 30 minutes at 45° C. Into this product was then dripped the mixture of 1 mole trichlorosilane and 6.6 moles toluene over a period of 5 hours at 30° C. followed by ageing for 30 minutes at 45° C. After cooling and layer separation, the toluenesulfonic acid layer (lower layer) was removed. In order to remove the acid present in the upper layer, it was washed with suitable quantities of sulfuric acid/water (50/50 weight ratio), then sulfuric acid/water (25/75 weight ratio), and finally water. The water was then completely eliminated by azeotropic reflux for 1 hour. The resulting toluene solution was designated toluene solution A. Removal of the toluene from toluene solution A by reduced pressure (rotary pump) at 60° C. gave polyhydrogen silsesquioxane A. Polyhydrogen silsesquioxane A had a number-average molecular weight ($M_n$) of 1,650, and the value of its weight-average molecular weight/number-average molecular weight ratio ($M_w/M_n$) was 19.4. The impurity content of polyhydrogen silsesquioxane A is reported in Table 1. When polyhydrogen silsesquioxane A was stored for 6 months at 25° C. under nitrogen, its $M_n$ became 28,900, and its $M_w/M_n$ became 3.27.

EXAMPLE 1

20 g of the polyhydrogen silsesquioxane A synthesized ill Reference Example 1 was placed in a 1 L round bottom flask made of high-quality glass. The flask had been preliminarily washed with acid and then with pure water and then thoroughly dried. 80 g thoroughly dried toluene was added and a thorough dissolution was effected. The entire system was maintained at 25° C., and the interior of the system was purged with nitrogen at a rate that did not remove solvent from the system. This purging was continued until the completion of fractionation. While vigorously stirring the solution, 50 g thoroughly dried acetonitrile was dripped in over a period of 1 hour. The precipitate was eliminated after quiescence for approximately 12 hours. After elimination of the precipitate, another 200 g thoroughly dried acetonitrile was dripped into the solution over a period of 4 hours. Collection of the resulting precipitate and removal of the residual solvent therefrom by vacuum drying at ambient temperature yielded polyhydrogen silsesquioxane. The $M_n$ of this polyhydrogen silsesquioxane was 11,400, its $M_w/M_n$ was 2.88, and its yield was 24 weight % based on the polyhydrogen silsesquioxane A charged. The impurity content of this polyhydrogen silsesquioxane is reported in Table 1. When this polyhydrogen silsesquioxane was stored at 25° C. under nitrogen for 6 months, neither its $M_n$ nor its $M_w/M_n$ changed.

EXAMPLE 2

20 g of the polyhydrogen silsesquioxane A synthesized in Reference Example 1 was placed in a 1 L round bottom flask made of high-quality glass. The flask had been preliminarily washed with acid and then with pure water and then thoroughly dried. 80 g thoroughly dried toluene was added and a thorough dissolution was effected. The entire system was maintained at 25° C., and the interior of the system was purged with nitrogen at a rate that did not remove solvent from the system. This purging was continued until the completion of fractionation. While vigorously stirring the solution, 60 g thoroughly dried acetonitrile was dripped in over a period of 1.2 hours. The precipitate was eliminated after quiescence for approximately 12 hours. After elimination of the precipitate, another 200 g thoroughly dried acetonitrile was dripped into the solution over a period of 4 hours. Collection of the resulting precipitate and removal of the residual solvent therefrom by vacuum drying at ambient temperature yielded polyhydrogen silsesquioxane. The $M_n$ of this polyhydrogen silsesquioxane was 9,630, its $M_w/M_n$ was 1.81, and its yield was 18 weight % based on the polyhydrogen silsesquioxane A charged. The impurity content of this silsesquioxane was stored at 25° C. under nitrogen for 6 months, neither its $M_n$ nor polyhydrogen silsesquioxane is reported in Table 1. When this polyhydrogen its $M_w/M_n$ changed.

EXAMPLE 3

20 g of the polyhydrogen silsesquioxane A synthesized in Reference Example 1 was placed in a 1 L round bottom flask made of high-quality glass. The flask had been preliminarily washed with acid and then with pure water and then thoroughly dried. 80 g thoroughly dried toluene was added and a thorough dissolution was effected. The entire system was held at 25° C., and in this case laboratory air was used for the interior of the system. While vigorously stirring the solution, 50 g thoroughly dried acetonitrile was dripped in over a period of 1 hour. The precipitate was eliminated after quiescence for approximately 12 hours. After elimination of the precipitate, another 200 g thoroughly dried acetonitrile was dripped into the solution over a period of 4 hours. Collection of the resulting precipitate and removal of the residual solvent therefrom by vacuum drying at ambient temperature yielded polyhydrogen silsesquioxane. The $M_n$ of this polyhydrogen silsesquioxane was 12,600, its $M_w/M_n$ was 3.12, and its yield was 25 weight % based on the polyhydrogen silsesquioxane A charged. The impurity content of this polyhydrogen silsesquioxane is reported in Table 1. When this polyhydrogen silsesquioxane was stored at 25° C. under nitrogen for 6 months, neither its $M_n$ nor its $M_w/M_n$ changed.

EXAMPLE 4

30 g of the polyhydrogen silsesquioxane A synthesized in Reference Example 1 was placed in a 1 L round bottom flask made of high-quality glass. The flask had been preliminarily washed with acid and then with pure water and then thoroughly dried. 70 g thoroughly dried toluene was added and a thorough dissolution was effected. The entire system was maintained at 25° C., and the interior of the system was purged with nitrogen at a rate that did not remove solvent from the system. This purging was continued until the completion of fractionation. While vigorously stirring the solution, 200 g thoroughly dried acetonitrile was dripped in over a period of 4 hours. The precipitate was collected after quiescence for approximately 12 hours and was then thoroughly dissolved in another 270 g thoroughly dried toluene. Another 250 g thoroughly dried acetonitrile was then dripped into this solution over a period of 5 hours. The resulting precipitate was removed, and the supernatant was recovered and bubbled with nitrogen at room temperature in order to eliminate the solvent. The $M_n$ of the resulting polyhydrogen silsesquioxane was 3,910, its $M_w/M_n$ was 2.74, and its yield was 31 weight % based on the polyhydrogen silsesquioxane A charged. The impurity content of this polyhydrogen silsesquioxane is reported in Table 1. When this polyhydrogen silsesquioxane was stored at 25° C. under nitrogen for 6 months, neither its $M_n$ nor its $M_w/M_n$ changed.

EXAMPLE 5

20 g of the polyhydrogen silsesquioxane A synthesized in Reference Example 1 was placed in a 1 L round bottom flask made of high-quality glass. The flask had been preliminarily washed with acid and then with pure water and then thoroughly dried. 80 g thoroughly dried n-hexane was added and a thorough dissolution was effected. The entire system was maintained at 25° C., and the interior of the system was purged with nitrogen at a rate that did not remove solvent from the system. This purging was continued until the completion of fractionation. While vigorously stirring the solution, 50 g thoroughly dried chloroacetone was dripped in over a period of 1 hour. The precipitate was eliminated after quiescence for approximately 12 hours. After elimination of the precipitate, another 200 g thoroughly dried chloroacetone was dripped into the solution over a period of 4 hours. Collection of the resulting precipitate and removal of the residual solvent therefrom by vacuum drying at ambient temperature yielded polyhydrogen silsesquioxane. The $M_n$ of this polyhydrogen silsesquioxane was 13,600, its $M_w/M_n$ was 2.97, and its yield was 22 weight % based on the polyhydrogen silsesquioxane A charged. The impurity content of this polyhydrogen silsesquioxane is reported in Table 1. When this polyhydrogen silsesquioxane was stored at 25° C. under nitrogen for 6 months, neither its $M_n$ nor its $M_w/M_n$ changed.

EXAMPLE 6

Toluene solution A as prepared in Reference Example 1 was concentrated to a polyhydrogen silsesquioxane concentration of 20 weight %. 100 g of this concentrate was introduced into a 1 L round bottom flask made of high-quality glass. This flask had been preliminarily washed with acid and then pure water and then thoroughly dried. The entire system was maintained at 25° C., and the interior of the system was purged with nitrogen at a rate that did not remove solvent from the system. This purging was continued until the completion of fractionation. While vigorously stirring the solution, 60 g thoroughly dried acetonitrile was dripped in over a period of 1.2 hours. The precipitate was eliminated after quiescence for approximately 12 hours. After elimination of the precipitate, another 200 g thoroughly dried acetonitrile was dripped into the solution over a period of 4 hours. The resulting precipitate was collected and the residual solvent was removed therefrom by vacuum drying at ambient temperature. The $M_n$ of the obtained polyhydrogen silsesquioxane was 9,550, its $M_w/M_n$ was 1.80, and its yield was 18 weight % based on the polyhydrogen silsesquioxane in the toluene solution A charged. The impurity content of this polyhydrogen silsesquioxane is reported in Table 1. When this polyhydrogen silsesquioxane was stored at 25° C. under nitrogen for 6 months, neither its $M_n$ nor its $M_w/M_n$ changed.

EXAMPLE 7

20 g of the polyhydrogen silsesquioxane prepared in Example 2 was placed in a 1 L round bottom flask made of high-quality glass. The flask had been preliminarily washed with acid and then with pure water and then thoroughly dried. 80 g thoroughly dried toluene was added and a thorough dissolution was effected. The entire system was maintained at 25° C., and the interior of the system was purged with nitrogen at a rate that did not remove solvent from the system. This purging was continued until the completion of fractionation. While vigorously stirring the solution, 60 g thoroughly dried acetonitrile was dripped in over a period of 1.2 hours. The precipitate was eliminated after quiescence for approximately 12 hours. After removal of the precipitate, another 200 g thoroughly dried acetonitrile was dripped into the solution over a period of 4 hours. Collection of the resulting precipitate and removal of the residual solvent therefrom by vacuum drying at ambient temperature yielded polyhydrogen silsesquioxane. The $M_n$ of this polyhydrogen silsesquioxane was 8,670 and its $M_w/M_n$ was 1.63. The impurity content of this polyhydrogen silsesquioxane is reported in Table 1. When this polyhydrogen silsesquioxane was stored at 25° C. under nitrogen for 6 months, neither its $M_n$ nor its $M_w/M_n$ changed.

COMPARATIVE EXAMPLE 1

20 g of the polyhydrogen silsesquioxane A synthesized in Reference Example 1 was placed in a 1 L round bottom flask made of high-quality glass. The flask had been preliminarily washed with acid and then with pure water and then thoroughly dried. 80 g thoroughly dried toluene was added and a thorough dissolution was effected. The entire system was maintained at 25° C., and the interior of the system was purged with nitrogen at a rate that did not remove solvent from the system. This purging was continued until the completion of fractionation. While vigorously stirring the solution, 50 g thoroughly dried methanol was dripped in over a period of 1 hour. During this addition the evolution of hydrogen was observed and the entire solution gelled, which indicated that a chemical reaction had occurred between the solvent and polyhydrogen silsesquioxane. The content of ionic impurities in this polyhydrogen silsesquioxane is reported in Table 1.

COMPARATIVE EXAMPLE 2

20 g of the polyhydrogen silsesquioxane A synthesized in Reference Example 1 was placed in a 1 L round bottom flask made of high-quality glass. The flask had been preliminarily washed with acid and then with pure water and then thoroughly dried. 80 g thoroughly dried toluene was added and a thorough dissolution was effected. The entire system was maintained at 25° C., and the interior of the system was purged with nitrogen at a rate that did not remove solvent from the system. This purging was continued until the completion of fractionation. While vigorously stirring the solution, 50 g thoroughly dried beta-hydroxyethyl ether was dripped in over a period of i hour. During this addition the evolution of hydrogen was observed and the entire solution gelled, which indicated that a chemical reaction had occurred between the solvent and polyhydrogen silsesquioxane.

[TABLE 1]

| | impurity content | | | | | | | | | | |
|---|---|---|---|---|---|---|---|---|---|---|---|
| | S (ppm) | Cl (ppm) | Na (ppb) | K (ppb) | Ca (ppb) | Fe (ppb) | Zn (ppb) | Mg (ppb) | Cr (ppb) | Ni (ppb) | Cu (ppb) |
| polyhydrogen silsesquioxane A | 255 | 36 | 320 | 257 | 65 | 88 | 24 | 26 | 28 | 31 | 55 |
| Example 1 | 5 | <1 | 15 | 8 | 5 | 6 | 3 | 7 | 2 | 4 | 3 |
| Example 2 | 2 | <1 | 9 | 5 | 5 | 4 | 4 | 6 | 2 | 3 | 3 |
| Example 3 | 4 | <1 | 22 | 16 | 5 | 6 | 5 | 7 | 3 | 4 | 3 |
| Example 4 | 14 | <1 | 82 | 44 | 11 | 8 | 5 | 11 | 6 | 4 | 6 |
| Example 5 | 5 | <1 | 18 | 10 | 5 | 2 | 3 | 9 | 10 | 6 | 3 |
| Example 6 | 2 | <1 | 6 | 5 | 9 | 4 | 3 | 6 | 2 | 3 | 3 |
| Example 7 | <1 | <1 | 2 | 2 | 1 | 1 | 1 | 2 | 1 | 2 | 1 |
| Comparison Example 1 | 221 | 30 | 188 | 201 | 55 | 44 | 3 | 25 | 19 | 10 | 23 |

That which is claimed is:

1. A Method for the molecular weight fractionation of polyhydrogen silsesquioxane comprising:
   dissolving polyhydrogen silsesquioxane in active hydrogen-free nonpolar solvent;
   adding sufficient active hydrogen-free polar solvent to the resulting solution to precipitate an upper molecular weight fraction of the polyhydrogen silsesquioxane; and
   collecting the desired molecular weight fraction of polyhydrogen silsesquioxane.

2. A method for the molecular weight fractionation of polyhydrogen silsesquioxane comprising:

dissolving polyhydrogen silsesquioxane in active hydrogen-free nonpolar solvent;

adding active hydrogen-free polar solvent to the resulting solution in order to precipitate polyhydrogen silsesquioxane that exceeds the desired average molecular weight;

removing the precipitated polyhydrogen silsesquioxane from the remaining polyhydrogen silsesquioxane solution;

adding active hydrogen-free polar solvent to the resulting solution in order to precipitate polyhydrogen silsesquioxane having the desired average molecular weight; and collecting the precipitated polyhydrogen silsesquioxane having the desired average molecular weight.

3. The method of claim 2 wherein the active hydrogen-free nonpolar solvent is selected from the group consisting of aromatic solvents, aliphatic solvents, and ether solvents.

4. The method of claim 2 wherein the active hydrogen-free nonpolar solvent is toluene.

5. The method of claim 2 wherein the active hydrogen-free nonpolar solvent is free of impurities and has a dielectric constant $\leq 5$.

6. The method of claim 2 wherein the active hydrogen-free polar solvent is selected from the group consisting of nitriles, chloroacetone, o-chloronitrobenzene, and nitrobenzene.

7. The method of claim 2 wherein the active hydrogen-free polar solvent is acetonitrile.

8. The method of claim 2 wherein the active hydrogen-free polar solvent is free of impurities and has a dielectric constant of at least 30.

9. The method of claim 2 wherein the fractionation is run in an inert gas atmosphere free of moisture.

10. The method of claim 2 wherein the fractionation is run in a container made of a material from which ionic impurities do not elute.

11. A method for the molecular weight fractionation of polyhydrogen silsesquioxane comprising:

dissolving polyhydrogen silsesquioxane in active hydrogen-free nonpolar solvent;

adding active hydrogen-free polar solvent to the resulting solution in order to precipitate polyhydrogen silsesquioxane;

removing the precipitated polyhydrogen silsesquioxane from the remaining polyhydrogen silsesquioxane solution;

dissolving the precipitated polyhydrogen silsesquioxane in active hydrogen-free nonpolar solvent;

adding active hydrogen-free polar solvent to the resulting solution in order to precipitate polyhydrogen silsesquioxane that exceeds the desired average molecular weight;

removing the precipitated polyhydrogen silsesquioxane from the solution; and collecting the desired polyhydrogen silsesquioxane solution.

12. The method of claim 1 wherein the fractionation process is repeated.

13. The method of claim 2 wherein the fractionation process is repeated.

14. The method of claim 11 wherein the fractionation process is repeated.

* * * * *